(No Model.)
D. E. REAGAN.
NUT LOCK.
No. 436,380.        Patented Sept. 16, 1890.
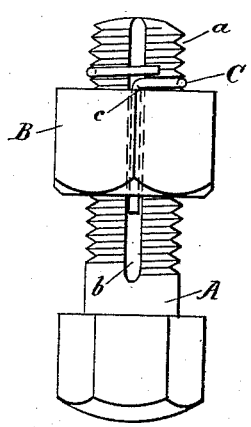
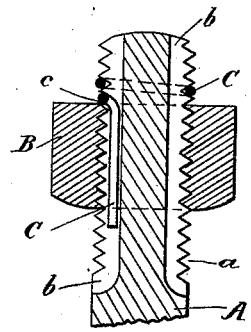
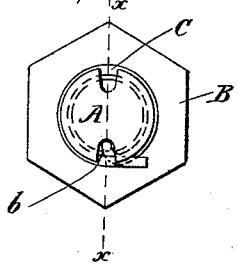
WITNESSES
Jas. K. M?Cathran
Frank L. Dyer
INVENTOR
D. E. Reagan.
by Herbert W. T. Jenner.
Attorney

UNITED STATES PATENT OFFICE.

DANIEL E. REAGAN, OF TERRE HAUTE, INDIANA.

NUT-LOCK.

SPECIFICATION forming part of Letters Patent No. 436,380, dated September 16, 1890.

Application filed November 29, 1889. Serial No. 331,948. (No model.)

*To all whom it may concern:*

Be it known that I, DANIEL E. REAGAN, a citizen of the United States, residing at Terre Haute, in the county of Vigo and State of Indiana, have invented certain new and useful Improvements in Nut-Locks; and I do hereby declare the following to be a full, clear, and exact description of the invention, such as will enable others skilled in the art to which it appertains to make and use the same.

This invention relates to nut-locks; and it consists in the novel construction and combination of the parts, as hereinafter fully described and claimed.

In the drawings, Figure 1 is a side view of a bolt provided with a nut-locking device according to this invention. Fig. 2 is an end view of the same. Fig. 3 is a longitudinal cross-section through the nut and a portion of the bolt, taken on line $x$ $x$ in Fig. 2. Fig. 4 is a side view of the locking-wire before it is applied to the bolt.

A is a bolt provided with a head and the screw-thread $a$ in the ordinary manner.

B is an ordinary nut adapted to screw upon the said bolt. The bolt is provided with a longitudinal groove $b$ for the locking-wire.

C is the locking-wire, which is of convenient size and cut off to a length appropriate to the size of the bolt to which it is to be applied. The groove $b$ is of such depth that the locking-wire may be pushed down it through the nut after the nut has been screwed upon the bolt. The nut is screwed upon the bolt as far as desired, and one end of the locking-wire is then inserted in the groove $b$. The projecting portion of the wire is then wound around the bolt in close engagement with the first screw-thread, which projects beyond the nut, as shown in Fig. 1. The other end of the wire may be cut off and the end bent down into the groove $b$, or the end may be left projecting, as desired. The wire effectually prevents the nut from being removed from the bolt until the wire is unwrapped from the screw-thread. The wire cannot be turned around by the nut because one end of it is in the longitudinal groove, and the wire cannot be pushed forward by the nut because it engages with the screw-thread on the bolt, and the elbow portion $c$ of the wire is pinched tightly between the top of the nut and the screw-thread directly the removal of the nut is attempted. It is desirable that there should be a full and clear screw-thread at the edge of the groove $b$, close to the top of the nut, especially when the nut is to be screwed up tightly against solid metal—as, for instance, when the bolt is used to couple the ends of railway-rails to their fish-plates. When the bolt is very large, a number of longitudinal grooves may be cut in it at equal distances apart, so that there will always be one full and clear screw-thread available. Two such grooves $b$ are shown in the drawings at opposite sides of the bolt. One of these grooves has a clear and open screw-thread upon one side of it close to the top of the nut and is adapted to receive the locking-wire. The opposite groove would have been the one to receive the locking-wire if the nut had been screwed up a half a turn, more or less, upon the bolt. The grooves may be forged or cut into the bolts, and they also afford means for oiling the screw-thread and permitting the nut to be removed with facility when desired, as the grooves will collect the rust when the bolt is turned. It will be noticed that the locking-wire does no injury to the threads of either bolt or nut; that the nut can be tightened or removed as often as desired by merely unwinding the wire, and that no particular skill or special tools are required to apply or to remove the locking device.

What I claim is—

1. In a nut-lock, the combination, with a bolt provided with a longitudinal groove, of an ordinary nut screwed upon said bolt, and a locking-wire inserted in the said groove between the bolt and the tops of the screw-threads of the nut and wound around said bolt in the first screw-thread projecting through the nut, substantially as and for the purpose set forth.

2. In a nut-lock, the combination, with a bolt provided with equidistant longitudinal grooves, of an ordinary nut screwed upon said bolt, and a locking-wire adapted to be inserted in any one of the grooves between the bolt and the tops of the screw-threads of the nut and to be wound around said bolt in the first clear screw-thread projecting through the nut, substantially as and for the purpose set forth.

3. The combination, with a bolt provided with a longitudinal groove, of an ordinary nut screwed upon said bolt, the locking-wire consisting of a straight portion in said groove, the outwardly-bent elbow portion c, interposed sidewise between the top edge of the nut and the screw-thread opening into the groove next to the top of the nut, and a spirally-curved portion engaging with the continuation of said screw-thread around the bolt, substantially as and for the purpose set forth.

In testimony whereof I affix my signature in presence of two witnesses.

DANIEL E. REAGAN.

Witnesses:
PETER N. STEFF,
HERMAN C. PROX.